No. 783,706.

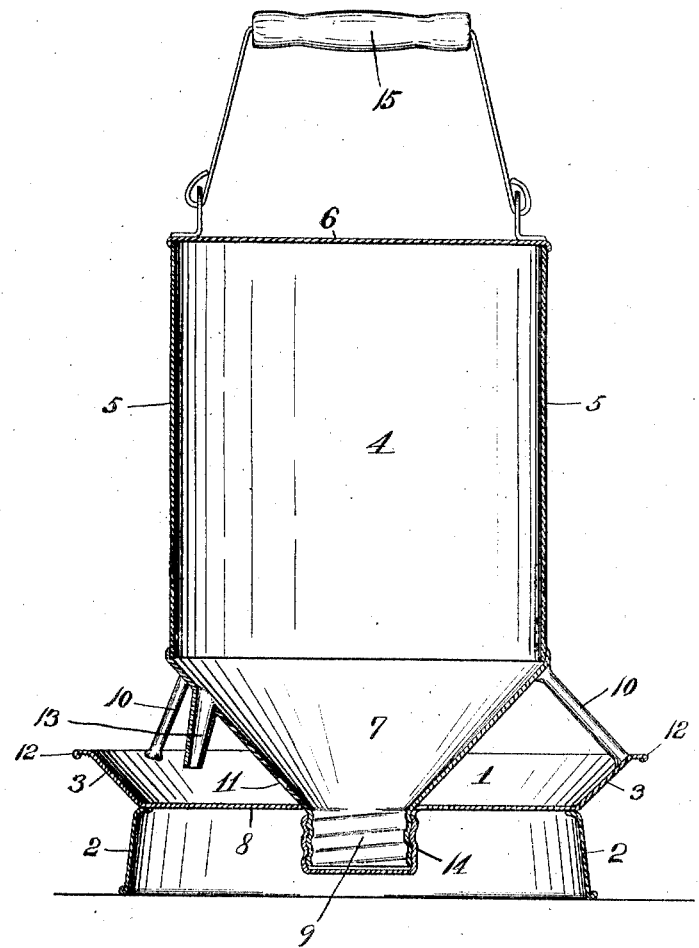

Patented February 28, 1905.

UNITED STATES PATENT OFFICE.

EDWARD RICHARD SOLEAU, OF BELLEVILLE, NEW JERSEY.

DRINKING-FOUNTAIN.

SPECIFICATION forming part of Letters Patent No. 783,706, dated February 28, 1905.

Application filed August 2, 1904. Serial No. 219,176.

*To all whom it may concern:*

Be it known that I, EDWARD RICHARD SOLEAU, a citizen of the United States of America, and a resident of Belleville, county of Essex, State of New Jersey, have invented certain new and useful Improvements in Drinking-Fountains, of which the following is a specification.

My invention relates to drinking-fountains, and refers more particularly to means for automatically feeding the liquid, and thereby preserving a constant supply in the drinking-basin.

In the care of poultry, for instance, it is a source of great inconvenience and labor to provide a constant supply of water. This is especially the case where poultry is raised on a large scale. It is obviously important that water be at all times accessible. To go from place to place to replenish the supply is clearly a waste of labor and time; and the object of my invention, therefore, is to provide means whereby this replenishment of water may be done automatically. At the same time I have aimed to provide a fountain readily portable and easily cared for and not easily upset.

In the single sheet of drawings accompanying this application I have shown a cross-sectional view of my fountain.

It will of course be understood that changes in the construction and arrangement of parts there shown may be made without departing from the spirit of my invention.

In the figure I have shown a receiving or drinking basin 1, suitably supported by the circular flange 2. In the present instance I have shown the sides 3 of this basin flaring outwardly, and this is a construction which I prefer.

4 indicates a reservoir whose sides 5 and top 6 are hermetically sealed. This reservoir may be constructed in any suitable manner; but I have here shown it in a preferred form having a diameter smaller than that of the basin 1 and having its lower portion 7 tapered and extending through the bottom 8 of the basin to form an intake 9.

The reservoir and basin may be secured in any suitable manner, as by standards 10, the portion of the reservoir passing through the bottom of the basin being preferably so constructed as to secure the two together.

At any suitable point, but preferably near the bottom of the basin, I provide an outlet 11 from the reservoir. At any proper point, preferably below the level of the rim 12 of the basin and above the plane of outlet 11, I provide an air-duct 13, leading into the reservoir. The intake is provided with a cap 14, and the handle 15, properly secured to the reservoir, renders the device easily portable.

The operation of my fountain will now be readily understood. The fountain is filled through the intake 9 and then inverted to the position shown in the drawing. As will be easily understood, the cap 14 acts when the fountain is inverted as a water seal against the admission of air through the intake. It will be seen that the air inducted through 13 will accumulate on the top of the reservoir, causing a pressure and a resulting flow of water from the outlet 11 into the basin. As the water rises in the basin to the level of the air-duct the latter is sealed, and the air-pressure in the reservoir being removed the water will cease flowing through the outlet 11 to the basin. The instant, however, that the water in the basin is brought below the level of the air-duct pressure is again allowed to force the water through the outlet 11.

It will thus be seen that I have provided a fountain automatically feeding the water into the drinking-basin and insuring a constant supply therein. While I have here shown my invention applied to a poultry-fountain, it is manifest that it may be adapted to other uses. For instance, constructed on a larger scale it would be adapted to supply water to horses and cattle, especially where raised on a large scale. It will therefore be understood that I do not limit myself to the use herein described.

Having thus described my invention, what I claim is—

1. As a new article of manufacture, an automatic fountain, comprising a receiving-basin, a reservoir having its top and sides hermetically sealed and its lower portion extending through the bottom of the receiving-basin to form an intake sealed against admission of air, said reservoir being provided with an outlet into said basin, and an air-duct adapted, when closed, to stop the flow of liquid from the reservoir to the basin.

2. As a new article of manufacture, an automatic fountain, comprising a receiving-basin, a reservoir having its top and sides hermetically sealed and its lower portion extending through the bottom of the receiving-basin to form an intake sealed against the admission of air, said reservoir being provided with an outlet into said basin below the level of the rim of the basin, and an air-duct located below the level of the rim of the basin and above the plane of the outlet and adapted, when closed, to stop the flow of liquid from the reservoir to the basin.

3. As a new article of manufacture, an automatic fountain, comprising a receiving-basin having its sides flaring outwardly, a reservoir of smaller diameter than the receiving-basin, having its top and sides hermetically sealed and its lower portion tapered and extending through the bottom of the receiving-basin to form an intake sealed against the admission of air, said reservoir being secured to the basin and provided with a handle, an outlet into the basin and an air-duct adapted, when closed, to stop the flow of liquid from the reservoir to the basin.

4. As a new article of manufacture, an automatic fountain, comprising a receiving-basin having its sides flaring outwardly, a reservoir of smaller diameter than the receiving-basin, having its top and sides hermetically sealed and its lower portion tapered and extending through the bottom of the receiving-basin to form an intake sealed against the admission of air, said reservoir being secured to the basin and provided with a handle, an outlet into the basin below the level of the rim of the basin, and an air-duct located below the level of the rim of the basin and above the plane of the outlet and adapted, when closed, to stop the flow of liquid from the reservoir to the basin.

5. As a new article of manufacture, an automatic fountain, comprising: a receiving-basin, a reservoir having its top and sides hermetically sealed and having an intake sealed against admission of air, said reservoir being provided with an outlet into said basin, an air-duct leading to the lower portion of said reservoir and adapted, when closed, to stop the flow of liquid from the reservoir to the basin.

6. As a new article of manufacture, an automatic fountain, comprising: a receiving-basin, a reservoir having its top and sides hermetically sealed, and an intake leading to the bottom of the reservoir and sealed against admission of air, said reservoir being provided with an outlet into said basin, and an air-duct leading to the lower portion of the reservoir and adapted, when closed, to stop the flow of liquid from the reservoir to the basin.

7. As a new article of manufacture, an automatic fountain, comprising: a receiving-basin, a reservoir having its top and sides hermetically sealed, an intake leading to the lower portion of the reservoir sealed against admission of air, said reservoir being provided with an outlet into said basin below the level of the rim thereof, and an air-duct leading to the lower portion of the reservoir and adapted, when closed, to stop the flow of liquid from the reservoir to the basin.

8. As a new article of manufacture, an automatic fountain, comprising: a receiving-basin, a reservoir having its top and sides hermetically sealed and its lower portion extending through the bottom of the receiving-basin, and having an intake sealed against admission of air, said reservoir being provided with an outlet into said basin below the level of the rim thereof, and an air-duct leading to the lower portion of the reservoir and adapted, when closed, to stop the flow of liquid from the reservoir to the basin.

9. As a new article of manufacture, an automatic fountain, comprising: a receiving-basin having its sides flaring outwardly, a reservoir having its top and sides hermetically sealed, an intake leading to the lower portion of the reservoir and sealed against the admission of air, an outlet into the basin below the level of the rim thereof, an air-duct leading to the lower portion of the reservoir and adapted, when closed, to stop the flow of liquid from the reservoir to the basin.

10. As a new article of manufacture, an automatic fountain, comprising; a receiving-basin, a reservoir of smaller diameter than the receiving-basin and having its top and sides hermetically sealed, an intake leading to the lower portion of the reservoir and sealed against the admission of air, an outlet into the basin, an air-duct leading to the lower portion of the reservoir and adapted, when closed, to stop the flow of liquid from the reservoir to the basin.

11. As a new article of manufacture, an automatic fountain, comprising: a receiving-basin, a reservoir having an outlet into said basin, and an air-duct leading to the lower portion of the reservoir and adapted, when closed, to stop the flow of liquid from the reservoir to the basin, and an intake sealed against the admission of air.

12. As a new article of manufacture, an automatic fountain, comprising: a receiving-basin, a reservoir having an outlet into said basin, an air-duct leading to the lower portion of the reservoir adapted, when closed, to stop the flow of liquid from the reservoir to the basin.

Signed at Newark, New Jersey, this 29th day of July, 1904.

EDWARD RICHARD SOLEAU.

Witnesses:
MARY DOERING,
RAYMOND C. SPAULDING.